(12) United States Patent
Vishniakou et al.

(10) Patent No.: US 12,481,139 B2
(45) Date of Patent: Nov. 25, 2025

(54) METHOD AND ILLUMINATION DEVICE OF THE ADAPTIVE OPTICS IN TRANSMISSION OR REFLECTION MICROSCOPY

(71) Applicant: MAX-PLANCK-GESELLSCHAFT ZUR FOERDERUNG DER WISSENSCHAFTEN E.V., Munich (DE)

(72) Inventors: Ivan Vishniakou, Bonn (DE); Johannes Dominik Seelig, Bonn (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 431 days.

(21) Appl. No.: 18/017,418

(22) PCT Filed: Jul. 19, 2021

(86) PCT No.: PCT/EP2021/070077
§ 371 (c)(1),
(2) Date: Jan. 23, 2023

(87) PCT Pub. No.: WO2022/018002
PCT Pub. Date: Jan. 27, 2022

(65) Prior Publication Data
US 2023/0273418 A1    Aug. 31, 2023

(30) Foreign Application Priority Data
Jul. 24, 2020  (DE) .................... 10 2020 119 566.4

(51) Int. Cl.
*G02B 21/00*   (2006.01)
(52) U.S. Cl.
CPC ....... *G02B 21/0032* (2013.01); *G02B 21/008* (2013.01); *G02B 21/0076* (2013.01)

(58) Field of Classification Search
CPC .............. G02B 21/0032; G02B 21/008; G02B 21/0076; G02B 21/06; G02B 21/361; G02B 21/365; G02B 27/0933
See application file for complete search history.

(56) References Cited

U.S. PATENT DOCUMENTS

| | | | | |
|---|---|---|---|---|
| 4,134,679 A | * | 1/1979 | Wertheimer | G01N 15/0205 356/336 |
| 6,169,289 B1 | * | 1/2001 | White | G02B 21/0004 250/461.1 |
| 2011/0006231 A1 | * | 1/2011 | Betzig | G01J 9/00 359/383 |
| 2020/0073100 A1 | * | 3/2020 | Gibson | G02B 27/02 |

FOREIGN PATENT DOCUMENTS

| | | |
|---|---|---|
| DE | 10 2018 108 628 A1 | 10/2019 |
| EP | 3 657 228 A1 | 5/2020 |

OTHER PUBLICATIONS

Débarre, Delphine, et al. "Image-based adaptive optics for two-photon microscopy." Optics Letters 34.16 (2009): 2495-2497 (Year: 2009).*

(Continued)

*Primary Examiner* — Mustak Choudhury
(74) *Attorney, Agent, or Firm* — Norman B. Thot (57) ABSTRACT

A method for optimizing parameters of a physical light propagation model includes providing a physical model of a light propagation in an optical system, radiating an input light distribution using an illumination unit into an excitation path of the optical system, traversing the input light distribution through a scattering body, wherein the scattering body is arranged in the excitation path of the optical system and modifies the input light distribution to form a transmission light distribution to form a reflection light distribution, recording the transmission light distribution or the reflection light distribution, transferring the recorded transmission light distribution or the recorded reflection light distribution to the physical model, and computing transmission distor- (Continued)

tion parameters of the physical model based on the recorded transmission light distribution or the recorded reflection light distribution. The transmission distortion parameters characterize the scattering body.

15 Claims, 3 Drawing Sheets

(56) References Cited

OTHER PUBLICATIONS

Vishniakou, Ivan, and Johannes D. Seelig. "Differentiable model-based adaptive optics with transmitted and reflected light." Optics Express 28.18 (2020): 26436-26446 (Year: 2020).*
A. Turpin et al.: "Light scattering control with neural networks in transmission and reflection", Center of Advanced European Studies and Research, arXiv:1805.05602v5 [physics.optics], pp. 1-31 (2019).
D. Débarre et al.: "Image-based adaptive optics for two-photon microscopy", Optics Letters, vol. 34, No. 16, pp. 2495-2497 (2009).
D. Wilding et al.: "Practical guidelines for implementing adaptive optics in fluorescence microscopy", Internatinal Society for Optical Engineeering, vol. 10502, pp. 105021F-1-105021F-12.
I. Vishniakou et al.: "Adaptive optics with reflected light and deep neural networks", ArXiv. Cornell University Library, pp. 1-11 (2020).
M. Kellman et al.: "Data-Driven Design for Fourier Ptychographic Microscopy", University of California—IEEE, pp. 1-8 (2019).
F. Wang et al.: "Phase imaging with an untrained neural network", Science & Applications, vol. 9, pp. 1-7 (2020).

* cited by examiner

METHOD AND ILLUMINATION DEVICE OF THE ADAPTIVE OPTICS IN TRANSMISSION OR REFLECTION MICROSCOPY

CROSS REFERENCE TO PRIOR APPLICATIONS

This application is a U.S. National Phase application under 35 U.S.C. § 371 of International Application No. PCT/EP2021/070077, filed on Jul. 19, 2021 and which claims benefit to German Patent Application No. 10 2020 119 566.4, filed on Jul. 24, 2020. The International Application was published in German on Jan. 27, 2022 as WO 2022/018002 A1 under PCT Article 21(2).

FIELD

The present invention relates to the technical area of adaptive microscopy and in particular adaptive transmission or reflection microscopy.

BACKGROUND

In optical microscopy, in particular in the optical microscopy of biological samples, imaging is limited by aberrations and scattering. It has been shown in this context that optical resolution can be improved if, for example, the method of laser scanning microscopy is combined with methods of adaptive optics. This enables aberrations to be reduced via suitable wavefront forming.

In order to examine such a sample having restricted transparency (i.e., subject to aberrations and light scattering), irradiation light can be analyzed after it has passed through the sample or when it is reflected from the sample. Imaging using reflected light in particular appears more suitable in the case of a sample having restricted light transmission, in particular if an image is to be recorded within a scattering material, which is better accessible optically from one side than from the other. If a sample is merely to be "processed", for example, via laser light, it is important above all that the laser light radiates after its transmission through the sample with a previously defined spatial intensity on the sample.

Imaging using reflected light is linked to the difficulty, however, that aberrations which arise in an excitation path (when the irradiation light is guided to the sample) and aberrations which arise in a detection path (the path which the light reflected from the sample runs) are generally different and are also not easy to separate from one another.

In other words: In numerous applications of (biological) microscopy, when an attempt is made to look using a light microscope into tissue or other materials which are only partially transparent, irradiation light beams are deflected and scattered, which results in a fuzzy image having little light. The irradiation light can in particular be provided by a laser which scans over the sample. The image thus generated is generally formed in that excitation light which penetrates from a microscope objective into the sample is partially reflected back into the objective and is focused into a "sample image", which is distorted because of the scattering. The distortion of an image within a material having little transparency results because the irradiation light which penetrates into the sample on the excitation path is deflected from its path. The light reflected from the sample behaves similarly: This is backscattered from a plane which is in the focus of a microscope. This focal plane (or better focal volume) can be viewed together with the reflecting structures which are there present (for example tissue) as a secondary light source. The reflected light originating from the secondary light source is collected by an objective and focused into an image. The reflected light (or in other words, the secondary light source) is deflected in its path out of the sample, similarly to the irradiation light, from its undisturbed path. The combined deflections of the irradiation light and the reflection light contribute, together with the properties of the reflective material, to the overall distortion of the image.

New methods of "machine learning", in particular with the aid of neural networks, offer novel approaches to correcting such distortions or aberrations both in the transmission and also in the reflection, which occur during the passage through a scattering body. To find corrections for these distortions, the neural networks are typically trained by large synthetically generated data sets. Large data sets are required to adjust the numerous parameters of a neural network and since the neural networks typically have no knowledge about an underlying image generating process. Even physical procedures known as such are therefore made accessible to the neural networks implicitly via the data sets.

The corresponding training data sets are in practice often based on superpositions of so-called "Zernike polynomials", which approximately simulate plausibly occurring distortions. These are, however, not always capable of accurately reproducing actually occurring distortions. The more strongly a scattering body "scatters", the higher the orders of these "Zernike polynomials" would be necessary to potentially comprise all possible "scattering situations" for these cases. Very large data sets are necessary for these cases, the generation of which would consume significant material and also time resources.

The publications by "Michael Kellman, Emrah Bostan, Michael Chen, and Laura Waller, 'Data-driven design for fourier ptychographic microscopy' in 2019 IEEE International Conference on Computational Photography (ICCP), pages 1-8, IEEE, 2019" and by "Fei Wang, Yaoming Bian, Haichao Wang, Meng Lyu, Giancarlo Pedrini, Wolfgang Osten, George Barbastathis, and Guohai Situ. 'Phase imaging with an untrained neural network' in Light: Science & Applications, 9(1):1-7, 2020" also describe problems in this field.

SUMMARY

An aspect of the present invention is to provide a method and an irradiation device via which distortions in an optical system can be effectively reduced.

In an embodiment, the present invention provides a method for optimizing parameters of a physical light propagation model which includes providing a physical model $M_{light}$ of a light propagation in an optical system, radiating an input light distribution $I_0$ using an illumination unit into an excitation path of the optical system, traversing the input light distribution $I_0$ through a scattering body, wherein the scattering body is arranged in the excitation path of the optical system and modifies the input light distribution $I_0$ to form a transmission light distribution $I_{TR}$ or $I_0$ to form a reflection light distribution $I_{RE}$, recording the transmission light distribution $I_{TR}$ or the reflection light distribution $I_{RE}$, transferring the recorded transmission light distribution $I_{TR}$ or the recorded reflection light distribution $I_{RE}$ to the physical model $M_{light}$, and computing transmission distortion parameters $V_{TR}$ of the physical model $M_{light}$ based on the recorded transmission light distribution $I_{TR}$ or the recorded reflection light distribution $I_{RE}$. The transmission distortion parameters $V_{TR}$ characterize the scattering body.

BRIEF DESCRIPTION OF THE DRAWINGS

The present invention is described in greater detail below on the basis of embodiments and of the drawings in which.

DETAILED DESCRIPTION

According to a first aspect of the present invention, a method for optimizing parameters of a physical light propagation model, in particular a light propagation model in (confocal) laser microscopy in the scanning method is provided, which comprises the following steps:

a) Providing a physical model $M_{light}$ of the light propagation in an optical system, in particular the light propagation in a microscope. Various physical models which are capable of describing a light propagation in optical systems can in principle be used for this purpose. Models of light propagation are mentioned as examples, which are described by matrix optics or by methods of wave optics. Providing the physical model in both cases results in an "information yield", since at least an undisturbed light propagation in the ideal case (for example, in the ideal case of the geometrical optics) is described by the models; the model $M_{light}$ can, for example, have at least partially prior information about the optical system, this prior information can be made known in the form of parameters. Such parameters also offer the advantage that they can be adapted; the model $M_{light}$ is thus in particular to be delimited from solely neural models which generally have no items of prior information and the linkages of which are first formed by training. As a technical effect, an information yield is achieved by the model $M_{light}$ of the light propagation in that numerous items of information about the optical system can already be used in that they are made known by the model $M_{light}$. This information yield makes a computation of distortion parameters significantly more efficient than the approaches of describing light propagation by machine learning.

b) Radiating an input light distribution $I_0$ using an illumination unit into an excitation path of the optical system. The input light distribution $I_0$ is typically radiated in using a laser beam having a Gaussian intensity profile which can be focused particularly advantageously in the optical system. A sample can be examined, for example, using the optical system. The light path which leads to a sample of the optical system is hereinafter designated as the excitation path, since the sample, when it is irradiated using the light distribution $I_0$, is quasi-"excited" to illuminate as a "secondary light source". The term excitation path is thus not to be understood to mean that the optical light path which leads to the sample is "excited". The input light distribution $I_0$ can, for example, be known and defined.

c) Traversing the light distribution $I_0$ through a scattering body, wherein the scattering body is placed in the excitation path of the optical system and modifies the input light distribution $I_0$ to form a transmission light distribution $I_{TR}$ or $I_0$ to form a reflection light distribution $I_{RE}$. The scattering body results in a distortion of the input light distribution $I_0$ and modifies it to form the transmission light distribution $I_{TR}$. The scattering body can to a certain extent be viewed as the element which converts the ideal light propagation according to the physical model $M_{light}$ into a real light propagation always having more or less strong distortions. Specifically, the scattering body can represent a distortion in the transmission of the input light distribution $I_0$ up to a target point/target plane within a sample, wherein the target point/the target plane is to be examined or processed, respectively.

d) Recording the transmission light distribution $I_{TR}$ or the reflection light distribution $I_{RE}$. The transmission light distribution $I_{TR}$ can be recorded directly at a location of the hypothetical sample or can be recorded via mirrors and/or beam splitters at another location using a recording unit. It is in principle possible that the recording unit records the intensity distribution and/or the phase distribution of the transmission light distribution $I_{TR}$. The reflection light distribution $I_{RE}$ can be guided through the optical system and in principle recorded in any focal plane, for example, at the focal plane in which the sample is actually to be observed in later applications.

e) Transferring the recorded transmission light distribution $I_{TR}$ or the reflection light distribution $I_{RE}$ to the model $M_{light}$. The known input light distribution $I_0$ can also be transferred to the $M_{light}$, by which further items of information are provided.

f) Computing transmission distortion parameters $V_{TR}$ of the model $M_{light}$ based on the recorded transmission light distribution $I_{TR}$, the known input light distribution $I_0$, and/or the reflection light distribution $I_{RE}$, wherein the transmission distortion parameters $V_{TR}$ in particular characterize the scattering body. $V_{TR}$ can also be computed if only the reflection light distribution $I_{RE}$ is known in that the distortion parameters of the transmission and the reflection are reflected quasi-simultaneously. A computation on the basis of $I_{TR}$ supplies more accurate results.

The advantage is thereby achieved that, due to the physical model $M_{light}$ of the light propagation in the optical system, numerous items of information about the optical system are provided quasi "a priori" and can be used in the computation of the transmission distortion parameters $V_{TR}$ in order to make this computation significantly more efficient than using conventional approaches of "machine learning" (in particular via neural networks). The conventional "machine learning" requires a very large amount of training data, in particular in the case of large distortions by the scattering body, and also because the neural networks used have no items of information about the underlying optical system and must additionally quasi model it. Due to the combination according to the present invention of a "machine learning" environment with the items of information about the optical system which are provided by the physical model $M_{light}$, it is possible to determine the transmission distortion parameters $V_{TR}$ significantly more efficiently using a much smaller set of measurement data or training data, respectively. The method also offers the advantage that no artificial "Zemike modes" are used to find the distortions, but rather a real scattering body which can, for example, also be used in later applications. If the transmission distortion parameters $V_{TR}$ are known, it can be determined how a light beam moves in the transmission direction through the optical system and which distortions it experiences during this passage.

According to one aspect of the present invention, the transmission light distribution $I_{TR}$ is recorded using a camera at a possible location of a sample. A CCD camera or a CMOS camera can be used for this purpose. Multiple cameras could also be used which have a slightly different focal plane in order to obtain additional information. Both camera types listed as examples are distinguished by a high spatial resolution. The higher the spatial resolution of the camera used is, the more items of information can be recorded about the optical system and the more accurately the transmission distortion parameters $V_{TR}$ can be calculated. A camera is only required in the reflection path for reflection experiments. Reflection experiments are an important configuration for applications in microscopy since, in this case, a focus within a scattering body is viewed as reflected light.

An n-fold transmission light distribution data set; $n$-$I_{TR}$, can, for example, be generated by an n-fold variation of the input light distribution $I_0$. This has the advantage that the transmission distortion parameters $V_{TR}$ can thereby be computed significantly more accurately, since, if only a single constant input light distribution $I_0$ is radiated in, possible variations of the optical system are not adequate to sufficiently characterize the scattering body. This is in particular the case if intensities other than the input light distribution $I_0$ are also to be used for later applications. In particular in the event of a strong variation of the amplitude of the intensity of the input light distribution $I_0$, higher-order optical effects can occur within the scattering body, which can be characterized by a data set $n$-$I_{TR}$. It is to be noted that the resulting amount of the data set $n$-$I_{TR}$ is significantly less than in the above-described conventional "machine learning" methods.

The light distribution is expediently varied via a spatial light modulator (SLM) which modulates the profile of the light beam. The control of the phase and intensity of the light beam is of great importance for many applications. The SLM can, for example, be based on liquid crystals and is in particular used for phase modulation. It is in this case expedient to use phase patterns for training the neural network. Alternatively thereto, the spatial light modulator can be a digital mirror for generating a binary intensity pattern. Known high-speed digital mirrors ("high-speed digital micromirror device", DMD) can generate binary patterns of high and low values (ones and zeros) at an image frequency of 22.7 kHz. If a continuous wave laser is thus, for example, used which continuously radiates onto the digital mirror, an n-tuple $(I_{Ei}, I_{Ai})$ can be generated at this frequency. This DMD can also be used to generate phase patterns. It is in principle possible to vary multiple light parameters (intensity, phase, and polarization) simultaneously using a combination of multiple optical modulators or using one modulator, in order to obtain the best possible control over the light distribution. The method thereby becomes even more flexible and accurate.

The model $M_{light}$ can, for example, be provided on a computer unit, and an algorithm implemented on the computer unit automatically computes the transmission distortion parameters $V_{TR}$.

This offers the advantage that the method for computing the transmission distortion parameters $V_{TR}$ can be carried out quickly, efficiently, and automatically, so that a user need not necessarily be present when carrying out the required experiments.

In an embodiment of the present invention, a differentiable model can, for example, be used as the physical model $M_{light}$ of the light propagation.

A differentiable, thus in particular analytically differentiable model offers the advantage of smaller errors and fewer computing steps than would be the case with numeric methods. To find the parameters of the model, in particular the distortion parameters $V_{TR}$, the parameters of the model are "changed" until the model describes the measured data set, and thus the recorded transmission light distribution $I_{TR}$, as well as possible. This optimization problem can be solved by finding a minimum of the first derivative of the differentiable model. The differentiable model maps input and output of the optical system. An automated differentiation can in particular be carried out which is part of frameworks of "machine learning" such as Tensorflow. The automatic differentiation is used in these frameworks to compute gradients to optimize a loss function with respect to parameters of interest. The loss function compares the model output to a target output, and the discrepancy is minimized by adapting the model parameters.

The transmission light distribution $I_{TR}$ can, for example, be reflected at the virtual location of the sample using a reflective material, in particular a mirror, so that it again traverses the scattering body, and is modified to form a reflection light distribution $I_{RE}$ and recorded as $I_{RE}$. The reflective material can also be inside the scattering body; only the origin of the reflected light from the location of the sample must be able to be detected.

The mirror which is placed instead of the sample at the location of the sample only has the task of reflecting the light $I_{TR}$ back. Instead of a mirror, a real sample could also be used. As is typical in optics, beams are both scattered and also reflected in the material in a specific relative ratio. It is thus essential for this embodiment that a reflection light distribution $I_{RE}$ is obtained and, as described above in conjunction with $I_{TR}$, is recorded by cameras. The above-described scattering body and the mirror can thus be replaced by a real sample which reflects a part of the light similar to a mirror. In the case of the reflected light, both the transmission distortion parameter $V_{TR}$ and the reflection parameter $V_{RE}$ must be determined simultaneously. The model $M_{light}$ is adapted for this purpose so that both unknown distortion parameters are determined simultaneously. For this purpose, the model $M_{light}$ is expanded so that both the excitation path and the detection path are described in the model. The two distortion parameters are used in the excitation path and in the detection path as unknown parameters to be optimized. Both distortions are found at the same time in the same manner as previously described for the transmission distortion parameter, wherein, as in the transmission using an n-fold variation of the input light distribution $I_0$, however, an n-fold reflection light distribution data set, $n$-$I_{RE}$, is now generated. The model $M_{light}$ is adapted with the aid of this data set in the same manner as described for the transmission configuration.

This offers the advantage that the distortions can also be measured in a reflection path, which is also designated as a detection path. In microscopy, samples are often observed in reflection, i.e., an observer observes the light reflected back from the sample. The distortions in the excitation path and in the detection path are generally not identical, so that both the reflection light distribution $I_{RE}$ and the transmission light distribution $I_{TR}$ must be detected in order to be able to determine the distortions in both paths.

In addition to the transmission distribution parameters $V_{TR}$, reflection distortion parameters $V_{RE}$ of the model $M_{light}$ can, for example, be computed based on the recorded reflection light distribution $I_{RE}$. To determine $V_{TR}$ and $V_{RE}$, it is sufficient to record only $I_{RE}$ and as a result to optimize the model with respect to both distortion parameters.

This offers the advantage that the adapted parameters of the optical model $M_{light}$ can describe or model, respectively, both the transmission and the reflection of the light beam. This information can in particular be used for applications in reflection microscopy.

An n-fold reflection light distribution data set, $n$-$I_{RE}$, can, for example, be generated by an n-fold variation of the input light distribution $I_0$. An arbitrary reflective or backscattering sample can be used for this purpose; only the origin of the scattered light behind or within a scattering body must be able to be determined. This results in a similar advantage to that explained above in conjunction with the data set $n$-$I_{RE}$.

The model $M_{light}$ can, for example, be provided on a computer unit, wherein the algorithm implemented on the computer unit simultaneously computes the transmission distortion parameter $V_{TR}$ and the reflection distortion parameter $V_{RE}$ automatically with the aid of only the reflection light distribution data set.

According to a second aspect of the present invention, an irradiation device is provided, wherein the irradiation device, in particular a laser reflection microscope, is suitable for carrying out one of the above-described methods. The irradiation device includes:
a microscope comprising,
an illumination unit, in particular a laser, designed to generate a light distribution $I_0$, and
an excitation path having a scattering body "A" provided in the excitation path,
wherein the excitation path guides the light distribution $I_0$ to the location of a sample;
a camera, which records the transmitted light, in particular at the location of a sample, as $I_{TR}$; and
a computer unit, wherein, the above-described physical model $M_{light}$ of the light propagation in the irradiation device is provided on the computer unit, and, wherein, an algorithm implemented on the computer unit is configured to compute transmission distortion parameters $V_{TR}$ of the model $M_{light}$ based on $M_{light}$ and $I_{TR}$.

The advantage is thereby achieved that a computation of the transmission distortion parameters $V_{TR}$ can be executed significantly more efficiently by the irradiation device than using conventional technologies of "machine learning". The "real scattering body" enables generation of distortion parameters which is not only hypothetical. In that an additional camera is provided, which is configured to record the reflected light $I_{TR}$, a correspondingly adapted device additionally enables the reflection distortion parameters $V_{RE}$ to be computed, as described above.

According to a third aspect of the present invention, a method for correcting distortions of a light distribution $I_1$ upon passage through an optical system having a scattering body, in particular in laser microscopy in the scanning method when irradiating a sample, is provided. The method includes the following steps:
a) extracting a transmission distortion parameter $V_{TR}$ as described above; and
b) setting a complementary distortion pattern $V_{TR}^{\#}$ on an optical modulator, in particular an SLM, of the excitation path (10), wherein, the optical modulator is arranged in the beam direction upstream of the scattering body. The complementary distortion pattern $V_{TR}^{\#}$ is based on the complexly conjugated pattern to $V_{TR}$.

The method can, for example, be modified if distortions are to be corrected in which the light distribution $I_1$ is additionally distorted in the reflection path and the light distribution $I_1$ is to be observed, for example, after the reflection at the sample with the best possible resolution. In this case, an extraction of the transmission distortion parameter $V_{TR}$ and simultaneously a reflection distortion parameter $V_{RE}$ take place, wherein only the reflection light distributions are recorded in the corresponding measurements—for example, without measurement of the transmission light distributions.

In this case, this is in particular the same scattering body or at least a scattering body having similar optical properties as the scattering body using which $V_{RE}$ and/or $V_{TR}$ were computed.

If the light distribution $I_1$ is now radiated into the optical system in a next step, the light distribution $I_1$ is modified beforehand by the distortion pattern $V_{TR}^{\#}$ set on the optical modulator so that the distortion $V_{TR}$ subsequently caused by the scattering body is compensated for so that in the ideal case, a light distribution arrives at the location of the sample which corresponds to the irradiated light distribution $I_1$. The optical distortions of the scattering body are thus effectively corrected, which is particularly advantageous for many applications. Applications comprise all situations which can profit from the control of a light distribution within or through a scattering body, for example, in microscopy using reflected light or using fluorescent light or other contrast methods. A further example is cutting tissue or bones with the aid of laser surgery. In this case, for example, imaging or diagnostics using the microscope could be combined with cutting using the laser in the same device, wherein only the intensity or wavelength would need to be adapted. Macroscopic applications are also conceivable, for example, optical signal transmission through scattering materials such as fog.

Upon the exit from the sample, the light distribution $I_1$ is again distorted by scattering effects corresponding to the factor $V_{RE}$, which are again compensated in that a further optical modulator is arranged in the reflection path in the beam direction after the exit of the light from the sample. The complementary distortion pattern $V_{RE}^{\#}$ is accordingly set on the further optical modulator to compensate for the optical distortions $V_{RE}$. This method enables the distortions induced by the sample to be substantially corrected and the image of the sample to be able to be detected at a high resolution or to be able to irradiate a sample using a defined spatially resolved intensity.

According to a fourth aspect of the present invention, an irradiation device is provided, wherein the irradiation device is configured to correct distortions of a light distribution $I_1$ upon passage through an optical system having a scattering body according to one of the above-described methods. The irradiation device, a laser reflection microscope, includes:
a microscope comprising,
an illumination unit, in particular a laser, designed to generate a light distribution $I_0$, and
an excitation path having a scattering body A provided in the excitation path, wherein, the excitation path guides the light distribution $I_0$ to the location of a sample. In this case, this is in particular the same scattering body or at least a scattering body having similar optical properties as the scattering body using which $V_{RE}$ and/or $V_{TR}$ were computed;

an optical modulator (30) which is provided in the excitation path before the scattering body in the light propagation direction; and a computer unit configured to control the optical modulator, wherein, the computer unit is configured to extract transmission distortion parameters $V_{TR}$ from a physical model $M_{light}$ of the light propagation in the irradiation device and to set the optical modulator using a complementary distortion pattern $V_{TR}^{\#}$ correcting the distortions of the scattering body.

The illumination device can, for example, additionally include a further optical modulator in the reflection path after the exit of the light from the sample, wherein the complementary distortion pattern $V_{RE}^{\#}$ is set on the further optical modulator.

Using this illumination device, distortions of a light beam during the passage through the optical system during the transmission, in particular distortions caused by the scattering body, can be effectively reduced. The further optical modulator effectively corrects a distorted image of a sample in reflection microscopy so that an image of the sample can be recorded at a higher resolution by the microscope.

Numerous features of the present invention are explained in more detail hereinafter on the basis of below exemplary embodiments with reference to the appended drawings. The present disclosure is thereby not restricted here to the specifically mentioned combinations of features. The features here mentioned may much rather be combined arbitrarily to form embodiments according to the present invention unless expressly precluded below.

Figure 1:
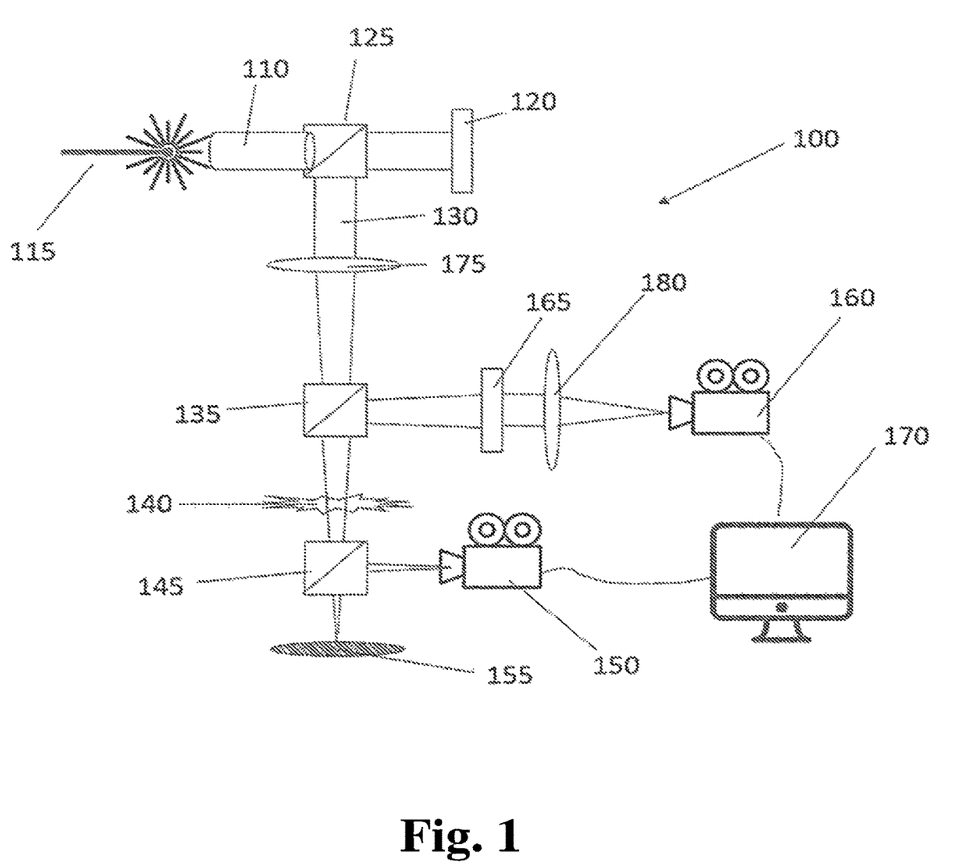
FIG. 1 shows a schematic structure of the adaptive irradiation device.

FIG. 1 illustrates the structure for determining distortions due to a scattering body and a corresponding correction of these distortions in the transmission and/or reflection direction.

The present invention provides a model optimization strategy for adaptive optics. The light propagation through an optical system 100 (the optical system is in particular a laser reflection microscope) is described, including the unknown aberrations represented as parameters, by a differentiable model $M_{light}$. To adapt the input-output behavior of the computing model $M_{light}$ to the experimental structure, a large number of output images are recorded, which result from corresponding input phase modulations. These input phase modulations are generated in that first an input light distribution $I_0$ 110 is generated by a laser 115 and then conducted to a first spatial light modulator (SLM) 120. Various patterns are played on the SLM for the respective experimental passes, which cause an input phase modulation of the input light distribution $I_0$ 110. As will also be shown in detail, the model parameters are optimized using the program "Tensorflow". In particular, distortion parameters of the transmitted light $V_{TR}$ and the reflected light $V_{RE}$ due to the scattering body are found, which permit an accurate description of the scattering body.

The experimental structure is schematically shown in FIG. 1. An expanded and collimated laser beam is generated by a laser 115 and reflected as input light distribution $I_0$ 110 by a first spatial light modulator SLM 120 having a first beam splitter 125 and conducted into an excitation path 130. The modulated light distribution $I_0$ passes through a second beam splitter 135 and then traverses a scattering body A 140 in the transmission direction, which induces a transmission distortion $V_{TR}$. After traversing the scattering body A 140, the light beam is directed by a third beam splitter 145 onto a first camera 150 in the transmission direction, wherein the first camera 150 records a transmission light distribution $I_{TR}$ with respect to its spatial intensity.

The part of the transmission light distribution $I_{TR}$ which is not guided by the third beam splitter 145 into the first camera 150 can be reflected by a mirror 155 in a sample plane, if this is provided in the structure, and traverses the scattering body A 140 again in the reflection direction. The mirror is used only as a possible substitute for an arbitrary sample. Instead of a mirror, any arbitrary other material can also be used at this point, the only condition is that the material reflects light. To restrict the origin of the reflected light, the method can also be combined with other methods which effectuate this (for example, with confocal microscopy or with interferometric methods such as "coherence gating"). The transmission light distribution $I_{TR}$ thereby experiences a renewed distortion due to the scattering body A 140, in this case a reflection distortion $V_{RE}$, and is changed to form the reflection light distribution $I_{RE}$. The second beam splitter 135 guides the reflection light distribution $I_{RE}$n into a second camera 160, wherein the second camera 160 records a reflection light distribution $I_{RE}$ with respect to its spatial intensity. A correction of the reflection distortion $V_{RE}$ can be executed by a second spatial light modulator 165, which is implemented in the beam path before the second camera 160.

To optimize the parameters of the model $M_{light}$, the first camera 150 and the second camera 160 can be connected directly to a computer unit 170 and can transmit their respective measurements to the computer unit 170. The model $M_{light}$ and a corresponding algorithm for computing the parameters are provided on the computer unit 170, so that the measurement of the cameras can be transferred directly as an input to the algorithm.

The lenses 175, 180 provided in the optical system are used for beam guiding or beam focusing.

The model $M_{light}$ is described in detail hereinafter in an embodiment.

Light which passes through the optical system 100 is described by a complex amplitude $U(x,y,z)$, which is initialized by $U_0=U(x, y, 0)$. This complex amplitude passes through a sequence of planar phase objects and propagates in between in a free space along the optical axis (z axis; x, y, z are spatial coordinates). A wavefront $U(x,y,d)$ which interacts with a phase object $\varphi(x,y,d)$ in the plane D can be described by the following multiplication:

$$U(x,y,d)\exp[i\varphi(x,y,d)] \qquad (1)$$

The propagation of the wavefront in the free space over a distance d is computed with the aid of the angle spectrum method using the following operator:

$$U(x,y,z+d)=P_d(U(x,y,z))=\iint A(f_x,f_y;z)\mathrm{circ}(\sqrt{(\lambda f_X)^2+(\lambda f_Y)^2})\times H\exp[i2\pi(f_X x+f_Y y)]df_X df_Y. \qquad (2)$$

with $A(f_X,f_Y;z)$ as the Fourier transform of $U(x,y,z)$, $f_X$ and $f_Y$ are spatial frequencies and the circ function is 1 within a radius in the argument and outside 0; and $H(f_X,f_Y)=$ $$\exp\left[i\pi\frac{d}{\lambda}\sqrt{1-(\lambda f_X)^2-(\lambda f_Y)^2}\right]$$

is the optical transfer function.

The intensities which are recorded by the cameras 150, 160 result as $$I(x,y,z)=|U(x,y,z)|^2. \qquad (3)$$

For a single transmission pass, the optical system is described by the following function:

$$S(\phi_{SLM}, \phi_{aberration}) = |P_{f_1}(\exp[i\phi_{aberration}]\exp[i\phi_{lens}]P_{f_1}(U_0 \exp[i\phi_{SLM}]))|^2 \quad (4)$$

In this case, $U_0$ is the complex amplitude of the unmodulated light distribution at the SLM 120, $\phi_{lens}$ is the phase representation of the lens 175, and $f_1$ is its focal length. $\phi_{SLM}$ is the (known) phase modulation by the SLM 120, and $\phi_{aberration}$ is the (unknown) distortion due to the scattering body A 140.

Finding the unknown distortion, which maximizes the similarity (which is determined by means of the Pearson correlation coefficient r) between the simulated camera images $S(\phi_{SLM}, \phi_{aberration})$ and the experimentally recorded camera images, was solved in that in the program "Tensorflow", an automatic differentiation and a gradient-based optimization were carried out according to the following formula:

$$\phi_{aberration} = \underset{\phi_{aberration}}{\operatorname{argmax}} \, (r[S(\phi_{SLM}, \phi_{aberration}), I]) \quad (5)$$

To refine the computed results further after a first optimization step, a second optimization step was carried out using a new set of modulations and corresponding images. In this second step, the corrections which were computed in the first step were added to all modulations, $\phi_{SLM} + \phi_{correction\ 1}$. The final correction was the sum of the first and the second correction, $\phi_{correction\ 1} + \phi_{correction\ 2}$. 180 modulations for the transmission and 540 modulations for the reflection experiments were used in each of the two iteration steps.

Figure 2:
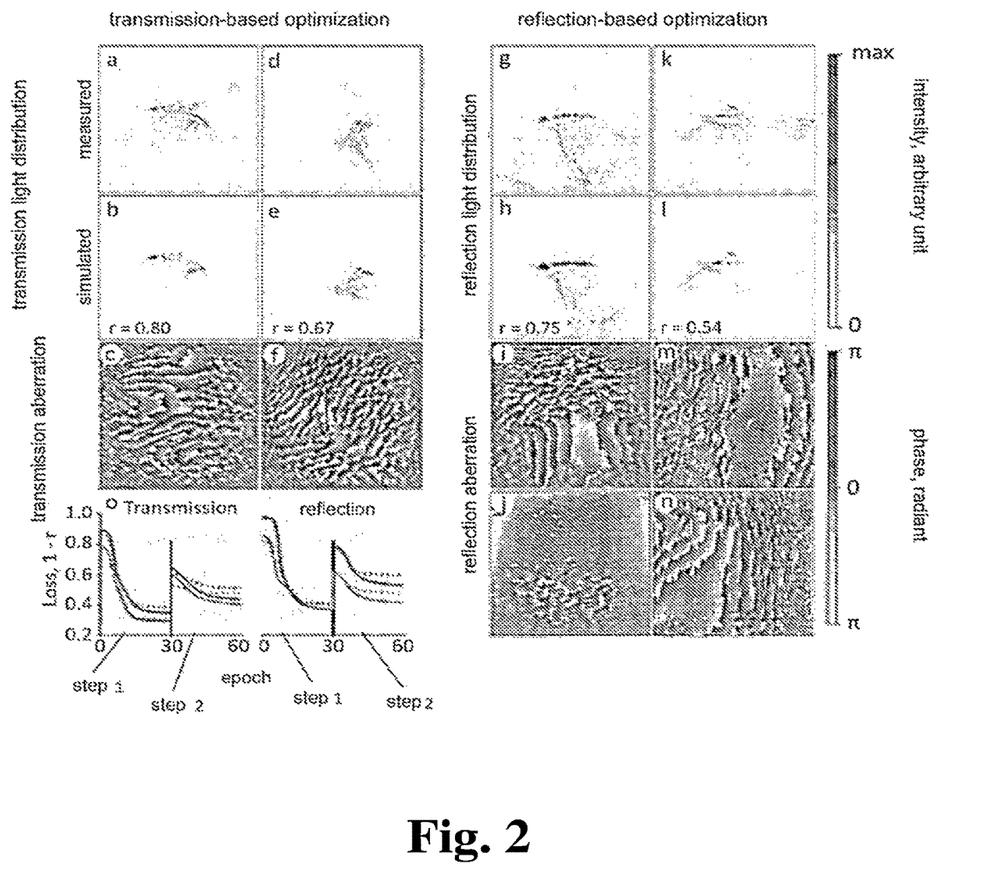
FIG. 2 shows a simulation of the influence of a scattering body on an irradiated input light distribution.
Figure 3:
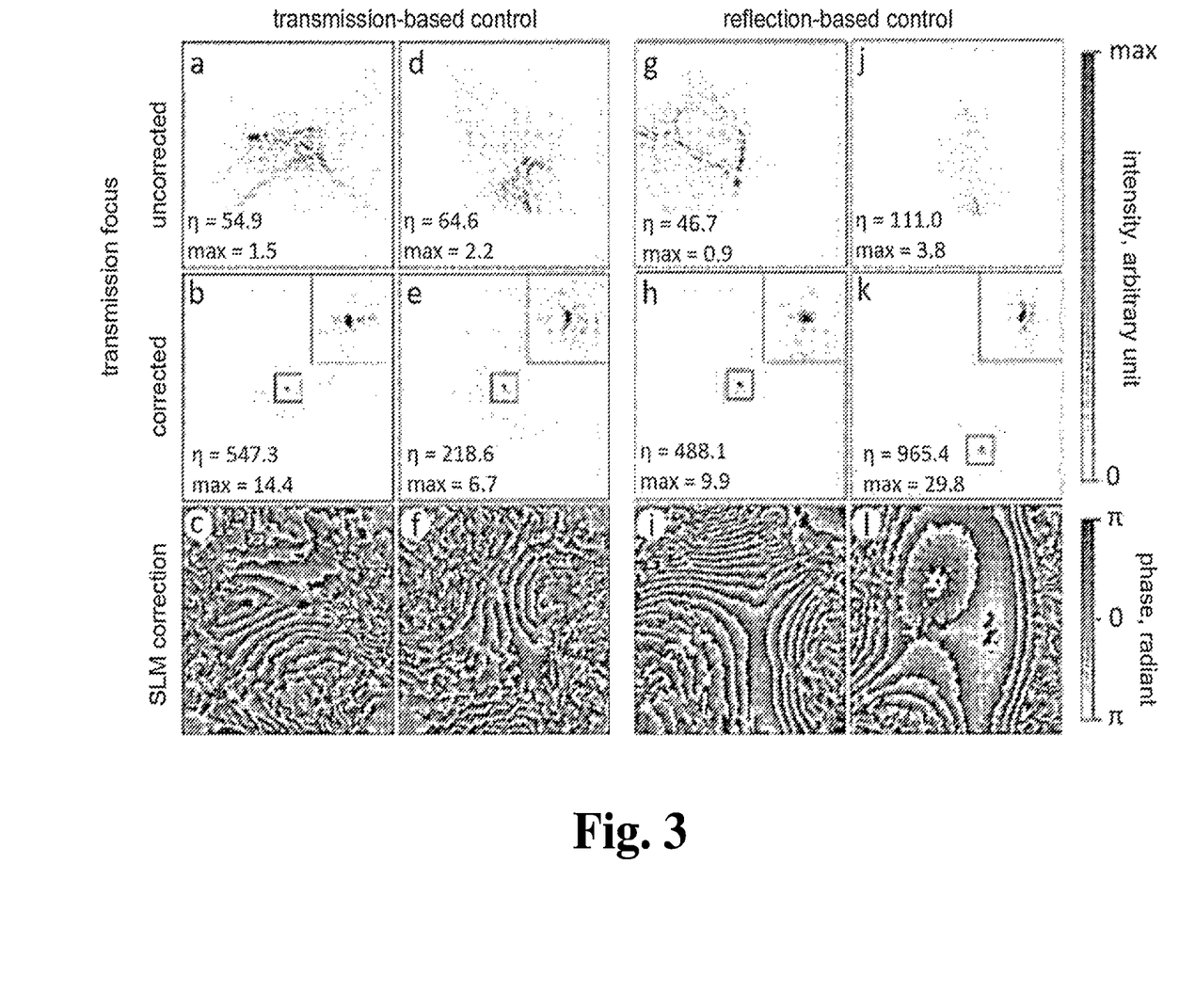
FIG. 3 shows a correction according to the present invention of the distortions during a transmission and a reflection by the scattering body.

As can be seen from two representative examples in a, b or d, e of FIG. 2, respectively, the optimization (which results in the corresponding phase profile in c and f of FIG. 2) results in a good correspondence (correlation coefficient r is indicated in b and e of FIG. 2) of measured and predicted light distributions at the sample (transmission camera 150) after application of the correction at the SLM 120. The similarity is quantified using the loss function 1-r in o of FIG. 2. To verify the correction achieved, the optimized aberration was propagated back in the plane of lens 175 to the SLM 120 (see methods) and the corresponding correction (c and f of FIG. 3) was set at the SLM 120. This resulted in a focus on the sample or camera plane, as shown on the basis of two representative examples in b and e of FIG. 3, wherein a and d of FIG. 3 show the corresponding foci without a corresponding correction.

In an epidetection configuration, as is typical for imaging in biological samples, reflected light is used for the search for a correction. However, reflected light accumulates a first aberration (transmission distortion) in the excitation path and a (generally different) second aberration in the reflection path. These two distortions have to be "untangled", for example, to play a correction pattern for the transmission and/or the reflection on the SLMs 120, 165. The transmission distortions must first be deliberately corrected to generate a focus within a sample. For applications using reflected light, equation (4) is therefore expanded, as described hereinafter in the methods, to incorporate the reflection passage from the mirror through the sample.

Two representative examples of predicted and measured light distributions on the sample plane (transmission camera 150) are shown in g, h and k, l of FIG. 2, respectively, and the loss function which quantifies the similarity is shown in o of FIG. 2 (correlation coefficient r between predicted and measured distributions is indicated in h and l of FIG. 2). The corresponding transmission and reflection phase aberrations in the plane of the lens 175 and 180 are shown in i, j and m, n of FIG. 2, respectively. To verify the correction, a focus was generated in the sample plane by setting the corresponding correction on the SLM 120 (see methods). FIG. 3 shows two representative examples (g-i and j-l) for a distorted focus, corrected focus, and corresponding correction (which results in an increase of the magnification by the factor 10.4 and 8.7, respectively, see methods).

In reflection-based transmission control, the focus obtained was not necessarily centered (see, for example, in j and k of FIG. 3) due to the inclination introduced by the sample, which was not corrected. It is important that in reflection-based experiments for transmission control, focusing was achieved in the transmission using reflected light which is compatible with an epidetection configuration.

In reflection-based transmission control, aberrations are computed simultaneously in two different focal planes independently of one another. This is similar to multi-conjugated adaptive optics, in which typically, however, an additional SLM is used to correct a second focal plane. In addition to generating individual foci, however, arbitrary other focus distributions could also be generated (for example, for applications in optogenetics).

One possibility for reducing a number of the samples in the above-described optimization method would be to combine a DIP with the above-described optimization method.

The number of the required samples is generally dependent on the size and the spatial frequency of the aberrations, so that stronger aberrations require more samples. This can be compared to the training of deep neural networks in which the number of the required samples for the model education also increases with increasing aberrations. In comparison to deep neural networks, the inclusion of a physical model of the light propagation enables aberration corrections to be found with a small number of random samples. It is also advantageous that no hypothetical assumptions (such as Zernike modes) about the distortions must be made.

The computation duration for finding the distortion parameters can advantageously be reduced by increasing the computing performance.

Thanks to the described computing environment, the introduced model-based optimization can be combined easily with another optical device, which is equipped with a spatial light modulator and a camera, without this requiring additional hardware, such as wavefront sensors or interferometers. The described technology for imaging through scattering materials can, for example, be used in a microscope with a high numerical aperture in an epidetection configuration. It is therefore expected that the developed method will be useful in many situations which require a correction of the light distribution upon passage through one or more layers of a scattering body.

The experimental setup, the data acquisition, the optimization of the model, and the evaluation of the present invention will be described in detail hereinafter.

Experimental Set Up and Data Acquisition

The laser is a model from Toptica (iBeam smart, 640 nm), the spatial light modulator (SLM) is from Meadowlark (SLM, ODP512-1064-P8), the cameras are from Basler (acA2040-55 um). All optical parts originated from Thorlabs.

The data were generated by placing a scattering body in the optical excitation path, by generating random SLM phase modulations, and recording the resulting 512×512 images using the transmission camera 150 and additionally using the reflection camera 160 for reflection experiments. Random SLM phase modulations were generated by summation of the first 78 Zernike modes with random coefficients, which originate from a normal distribution having the standard deviation r and are generated at a resolution of 512×512 pixels on the SLM.

The light intensity of the transmission and the reflection can vary by several orders of magnitude and can exceed the dynamic range of the cameras. To detect the entire range of the intensities, multiple images having different exposure times possibly must therefore be recorded (each image at a resolution of 12 bits per pixel).

In the case of transmission, each individual image was recorded at an exposure time of 60, 120, and 250 ms, respectively, and the resulting image was the sum of the recorded individual images, weighted with the reciprocal of the exposure time. Both saturated pixels and also pixels below the noise threshold were discarded. For the reflection camera, the images were recorded at exposure times of 60, 120, 250, 500, and 1000 ms. The transmission light intensity was additionally reduced using a "neutral density filter wheel" (NDM2/M, Thorlabs).

Optimization of the Model

A Python library for diffractive optics was used to compute the known factors of equation (4). By specifying the focal lengths and setup dimensions, discretized versions of the optical transfer functions were determined for the propagation operators and the phase display of the lenses. The resulting function, which relates known SLM phase modulations and unknown sample aberrations to camera images, was transferred into the Tensorflow environment.

The position of the scattering body, as can be seen in equation (4), was simulated in the plane of a lens 175. This reduces computing resources and storage space, since each intermediate plane requires additional wavefront propagation computations. In a similar manner, for reasons of computing efficiency, a single lens 180 having the focal length $f_2=f_1/2$ was used in order to focus the reflected light on the reflection camera. While the parameters of the optical model for transmission and reflection were adapted manually to the structure, they can also be determined using the optimization approach described below, for example, to obtain a corresponding system correction.

The model of the light propagation according to equation (4) was incorporated according to equation (5) in a loss function:

$$\text{loss} = 1 - r[S(\phi_{SLM}, \phi_{aberration}), I] \quad (6),$$

wherein $\varphi_{SLM}$ and $\varphi_{abberation}$ represent the phase modulation generated by the SLM and by the optical system, in particular by the scattering body. All variables are 512×512 "real-valued" sensors, wherein $\varphi_{abberation}$ is the variable to be optimized.

Similarly to in the training of neural networks, the data are divided into training and validation sets. An Adam optimizer having a learning rate of 0.1 and a "batch size" of 30 was used. The optimization using the loss function leads to a correspondence of simulated and experimentally recorded images and resulted in the phase profile of the distortions of the optical system. The quality of the solution was quantified by a correlation between modeled and recorded images in the validation part of the data set and used as a criterion for "ending" the optimization. The convergence of the optimization process is dependent on the size and spatial frequencies of the aberration and the number of the samples. It was shown that optimized parameters having a value of r>0.6 are sufficient in many cases to focus the laser beam with a desired intensity profile on the sample.

For experiments using reflected light, the model of the light propagation was expanded to also detect the distortions of the light in the detection path during the traversal of the scattering body or of the entire optical system, respectively. The following adaptation for equation (4) follows therefrom:

$$S(\phi_{SLM}, \phi_{trans}, \phi_{refl}) = \\ \left| \left( \begin{array}{c} \exp[i\phi_{lens\ 2}]\exp[i\phi_{ref}] \times \\ P_{2f1}(\exp[i\phi_{trans}]\exp[i\phi_{lens}] \times P_{f1}(U_0\exp[i\phi_{SLM}])) \end{array} \right) \right|^2, \quad (7)$$

wherein loss function (6) is optimized with respect to $\varphi_{trans}$ (corresponding to the distortion of the transmission) and $\varphi_{ref}$ (corresponding to the distortion of the reflection).

Evaluation

After $\varphi_{abberation}$ has been computed by a corresponding optimization in the lens plane, the corresponding correction of the SLM is determined in that the conjugated phase of the $\varphi_{abberation}$ distortion is propagated in reverse onto the plane of the SLM:

$$\phi_{correction} = \arg(P_{-f1}(\exp[-i\phi_{abberation}])) \quad (8).$$

If the SLMs are thus programmed using the corresponding phase corrections $\varphi_{correction}$, the distortions by the sample body are effectively corrected. The correction found using a low-pass location frequency filter was additionally smoothed. The discrete Fourier transform was applied to $\exp[i\varphi_{correction}]$ and frequencies which exceeded 0.1 of the pattern resolution were discarded. Upon the representation of the correction on the SLM, this results in a compensation of the aberrations.

The distortions were generated using a thin layer of transparent nail polish, distributed on a slide. Two different scattering bodies were used for transmission and reflection experiments. The strength of the aberrations generally varies depending on sample positioning.

Optimization parameters (such as the number of the phase modulations or the learning rate) were adapted only once for transmission experiments and once for reflection experiments. As a simple measure for the quantification of the form of the uncorrected light distributions, their maximum extension was used, measured by the length of the first main component of the pixels above a 30% intensity threshold, $\sigma$. In order to quantify the change in the distribution before and after the correction, a comparison of the uncorrected and corrected distribution, $\sigma_{rel} = \sigma_u/\sigma_c$ was performed. In order to additionally quantify the quality of the aberration correction, an improvement metric was used, which is defined as the ratio of the maximum intensity to the mean intensity in the context, $\eta = \max(I)/\text{mean}(I)$, and compared before and after the correction $\eta_{rel} = \eta_u/\eta_c$. The distribution of the parameters ($\eta_{rel}, \sigma_{rel}$) was as follows for a series of 7 transmission experiments: (10.0; 25.3), (1.7; 6.5), (3.4; 12.1), (2.6; 10.4), (0.8; 1.2), (16.2; 25.4), (3.8; 9.8), ($\eta_{rel}$)=5.49±5.17; ($\sigma_{rel}$)= 13.0±8.47; and for a series of 7 reflection experiments (10.0; 8.2), (10.4; 32.6), (11.6; 11.1), (7.2; 13.0), (8.7; 4.3), (4.4; 12.3), (1.9; 2.6); ($\eta_{rel}$)=7.74±3.26; ($\sigma_{rel}$)=12.0±9.17.

The present invention is not limited to embodiments described herein; reference should be had to the appended claims.

LIST OF REFERENCE NUMERALS

100 Optical system
110 Input light distribution $I_0$

115 Laser
120 First spatial light modulator (SLM)
125 First beam splitter
130 Excitation path
135 Second beam splitter
140 Scattering body A
145 Third beam splitter
150 First camera/Transmission camera
155 Mirror
160 Second camera/Reflection camera
165 Second spatial light modulator (SLM)
170 Computer unit
175 Lens
180 Lens

What is claimed is:

1. A method for optimizing parameters of a physical light propagation model, the method comprising:
providing a physical model $M_{light}$ of a light propagation in an optical system;
radiating an input light distribution Io using an illumination unit into an excitation path of the optical system;
traversing the input light distribution Io through a scattering body, wherein the scattering body is arranged in the excitation path of the optical system and modifies the input light distribution Io to form a transmission light distribution $I_{TR}$ or to form a reflection light distribution $I_{RE}$;
recording the transmission light distribution $I_{TR}$ by a first camera or the reflection light distribution $I_{RE}$ by a second camera, each of the first camera and the second camera being connected to a computer unit;
transferring the recorded transmission light distribution $I_{TR}$ or the recorded reflection light distribution $I_{RE}$ to the computer unit on which the physical model $M_{light}$ and an algorithm for calculating transmission distortion parameters $V_{TR}$ are stored so that a measurement of the first camera and a measurement of the second camera can each be transferred directly as an input to the algorithm; and
computing the transmission distortion parameters $V_{TR}$ of the physical model $M_{light}$ based on the recorded transmission light distribution $I_{TR}$ of the first camera or the recorded reflection light distribution $I_{RE}$ of the second camera, wherein the transmission distortion parameters $V_{TR}$ characterize the scattering body,
wherein,
the physical light propagation model is a light propagation model in laser microscopy in a scanning method, and the light propagation in the optical system is a light propagation in a microscope.

2. The method as recited in claim 1, wherein the recording of the transmission light distribution $I_{TR}$ using the first camera is performed at a virtual location of a sample.

3. The method as recited in claim 1, wherein an n-fold transmission light distribution data set n-$I_{TR}$ is generated by an n-fold variation of the input light distribution $I_0$.

4. The method as recited in claim 1, wherein
the computing of the transmission distortion parameters $V_{TR}$ of the physical model $M_{light}$ based on the recorded transmission light distribution $I_{TR}$ is performed automatically via the algorithm implemented on the computer unit.

5. The method as recited in claim 1, wherein a mathematically differentiable model $M_{light}$ is used as the physical model $M_{light}$ of the light propagation.

6. The method as recited in claim 1, further comprising:
reflecting the transmission light distribution $I_{TR}$ at a location of a sample using a reflective material so that the transmission light distribution $I_{TR}$ again traverses the scattering body and is modified to form the reflection light distribution $I_{RE}$; and then
recording the refection light distribution $I_{RE}$ with the second camera.

7. The method as recited in claim 6, wherein the reflective material is a mirror.

8. The method as recited in claim 6, further comprising:
computing reflection distortion parameters $V_{RE}$ of the physical model $M_{light}$ based on the recorded reflection light distribution $I_{RE}$.

9. An irradiation device for performing the method as recited in claim 1, the irradiation device comprising:
a microscope comprising,
an illumination unit which is designed to generate a light distribution $I_0$, and
an excitation path comprising a scattering body which is arranged in the excitation path, the excitation path being configured to guide the light distribution $I_0$ to a location of a sample;
a camera which is configured to record a transmitted light $I_{TR}$; and
a computer unit comprising an algorithm implemented thereon,
wherein,
a physical model $M_{light}$ of a light propagation in the irradiation device is provided on the computer unit, and
the algorithm implemented on the computer unit is configured to compute transmission distortion parameters $V_{TR}$ of the physical model $M_{light}$ based on the physical model $M_{light}$ and the transmitted light $I_{TR}$.

10. The irradiation device as recited in claim 9, wherein,
the illumination unit is a laser, and
the transmitted light $I_{TR}$ is at the location of the sample.

11. A method for correcting distortions of a light distribution during passage through an optical system which comprises a scattering body, the method comprising:
extracting a transmission distortion parameter $V_{TR}$ as computed in claim 1; and
setting a complementary distortion pattern $V_{TR}^{\#}$ on an optical modulator of an excitation path,
wherein,
the optical modulator is arranged in a beam direction before the scattering body.

12. The method as recited in claim 11, wherein the method is performed in a laser microscopy in a scanning method during an irradiation of a sample.

13. The method as recited in claim 11, further comprising:
extracting a reflection distortion parameter $V_{RE}$ by computing reflection distortion parameters $V_{RE}$ of the physical model $M_{light}$ based on the recorded reflection light distribution $I_{RE}$; and
setting a complementary distortion pattern $V_{RE}^{\#}$ on a further optical modulator in a detection path.

14. An irradiation device for performing the method as recited in claim 11, the irradiation device comprising:
a microscope comprising,
an illumination unit which is configured to generate a light distribution $I_0$, and
an excitation path comprising a scattering body which is arranged in the excitation path, the excitation path being configured to guide the light distribution $I_0$ to a location of a sample;

an optical modulator arranged in the excitation path in a light propagation direction before the scattering body; and a computer unit which is configured to,
- control the optical modulator,
- to extract transmission distortion parameters $V_{TR}$ from the physical model $M_{light}$ of the light propagation in the irradiation device, and
- to set the optical modulator using a complementary distortion pattern $V_{TR}^{\#}$ correcting distortions of the scattering body.

15. The irradiation device as recited in claim 14, wherein, the illumination unit is a laser.

* * * * *